US008996672B2

(12) United States Patent
Holland

(10) Patent No.: US 8,996,672 B2
(45) Date of Patent: Mar. 31, 2015

(54) APPLICATION DATA LAYER COVERAGE DISCOVERY AND GAP ANALYSIS

(75) Inventor: Yaron Holland, Hod Hasharon (IL)

(73) Assignee: CA, Inc., New York, NY (US)

( * ) Notice: Subject to any disclaimer, the term of this patent is extended or adjusted under 35 U.S.C. 154(b) by 352 days.

(21) Appl. No.: 13/440,654

(22) Filed: Apr. 5, 2012

(65) Prior Publication Data

US 2013/0268642 A1 Oct. 10, 2013

(51) Int. Cl.
G06F 15/173 (2006.01)
G06Q 10/00 (2012.01)
G06F 11/00 (2006.01)
H04L 12/24 (2006.01)

(52) U.S. Cl.
CPC ............ H04L 41/145 (2013.01); H04L 41/022 (2013.01); *H04L 41/0856* (2013.01)
USPC ................. 709/223; 709/224; 726/25; 705/4; 705/7.11; 705/7.13; 705/7.28

(58) Field of Classification Search
USPC ................ 726/25; 709/223–224; 705/4, 7.11, 705/7.13, 7.28; 455/41.2, 422.1, 436
See application file for complete search history.

(56) References Cited

U.S. PATENT DOCUMENTS

| 7,971,231 | B2 | 6/2011 | Gupta et al. | |
|---|---|---|---|---|
| 8,082,337 | B1 * | 12/2011 | Davis et al. .................... | 709/223 |
| 8,290,841 | B2 * | 10/2012 | Beigi et al. ...................... | 705/35 |
| 2004/0128186 | A1 * | 7/2004 | Breslin et al. .................... | 705/10 |
| 2005/0008001 | A1 * | 1/2005 | Williams et al. .............. | 370/352 |
| 2006/0141932 | A1 * | 6/2006 | Lawrence et al. ............. | 455/41.2 |
| 2009/0119141 | A1 * | 5/2009 | McCalmont et al. ............. | 705/7 |
| 2009/0282307 | A1 * | 11/2009 | Chaturvedula et al. ....... | 714/738 |
| 2010/0199352 | A1 * | 8/2010 | Hill et al. ......................... | 726/25 |
| 2011/0289588 | A1 * | 11/2011 | Sahai et al. ..................... | 726/25 |
| 2012/0233596 | A1 * | 9/2012 | Adler et al. .................... | 717/124 |
| 2012/0311416 | A1 * | 12/2012 | Richter et al. ................. | 715/202 |
| 2013/0096955 | A1 * | 4/2013 | Pesci-Anderson et al. ....... | 705/4 |
| 2013/0286773 | A1 * | 10/2013 | Haumonte ...................... | 367/16 |
| 2014/0019194 | A1 * | 1/2014 | Anne ........................... | 705/7.28 |

OTHER PUBLICATIONS

"Nimsoft Service Desk", [Online]. ] Retrieved from the Internet: <URL: http://web.archive.org/web/20120623045255/http://www.nimsoft.com/solutions/nimsoft-service-desk/configuration-management.html>, (Archived Jun. 23, 2012), 1 pg.

(Continued)

*Primary Examiner* — Wing F Chan
*Assistant Examiner* — Raji Krishnan
(74) *Attorney, Agent, or Firm* — Schwegman Lundberg & Woessner, P.A.

(57) ABSTRACT

Systems and methods that receive at information technology (IT) management system data from at least two IT management systems, wherein the data identifies resource coverage known to each respective IT management system are discussed. The system or method may generate an IT management system coverage map as a function of the IT management system data using the coverage map generator, wherein the coverage map indicates if there is a gap in IT resource coverage of the at least two IT management systems and whether the IT resource gap creates a possible compliance issue with a policy to be followed by one of the at least two IT management systems, and wherein the IT resource gap is discovered by comparing the IT management system data of the at least two IT management systems.

19 Claims, 5 Drawing Sheets

(56) References Cited

OTHER PUBLICATIONS

"VMware vShield Product Family", [Online]. Retrieved from the Internet: <URL: http://web.archive.org/web/20120719141703/http://www.vmware.com/products/vshield/overview.html>, (Archived Jul. 19, 2012), 1 pg.

* cited by examiner

APPLICATION DATA LAYER COVERAGE DISCOVERY AND GAP ANALYSIS

BACKGROUND

Prior attempts to provide information technology (IT) system coverage information, and IT management system information focus on management and coverage systems that stand alone. Each system has its own method of figuring out which resources it manages. Lists of resources generated by such systems may be incomplete, as each system is not aware of resources they do not manage. In recent years there has been an increase in the number of policies with which to comply. Compliance with the policies is only being checked for resources each system is aware of, creating the risk that a resource unknown to a system will create a noncompliance issue.

BRIEF SUMMARY

According to one aspect of the present disclosure a computer implemented method comprises receiving information technology (IT) management system data from at least two IT management systems, wherein the data identifies resource coverage known to each respective IT management system, and generating an IT management system coverage map on a computer readable storage device as a function of the IT management system data using the coverage map generator, wherein the coverage map indicates if there is a gap in IT resource coverage of the at least two IT management systems and whether the IT resource gap creates a possible compliance issue with a policy to be followed by one of the at least two IT management systems, and wherein the IT resource gap is discovered by comparing the IT management system data of the at least two IT management systems.

According to one aspect of the present disclosure a system comprises a network connector to receive data from at least two IT management systems wherein the data identifies resource coverage known to each respective IT management system. A coverage map generator is coupled to the network connector, the coverage map generator to create coverage maps as a function of IT resource coverage of the at least two IT management systems, wherein the coverage map indicates if there is a gap in IT resource coverage of the at least two IT management systems and whether the IT resource gap creates a potential compliance issue with a policy to be followed by one of the at least two IT management systems, and wherein the IT resource gap is discovered by comparing the IT management system data of the at least two IT management systems.

A machine readable medium storing instructions, the instructions, which when performed by a machine, cause the machine to perform operations comprising receiving information technology (IT) management system data from at least two IT management systems, wherein the data identifies resource coverage known to each respective IT management system, and generating an IT management system coverage map as a function of the IT management system data, wherein the coverage map indicates if there is a gap in IT resource coverage of the at least two IT management systems and whether the IT resource gap creates a possible compliance issue with a policy to be followed by one of the at least two IT management systems, and wherein the IT resource gap is discovered by comparing the IT management system data of the at least two IT management systems.

BRIEF DESCRIPTION OF THE DRAWINGS

Aspects of the present disclosure are illustrated by way of example and are not limited by the accompanying figures with like references indicting like elements.

DETAILED DESCRIPTION

Figure 1:
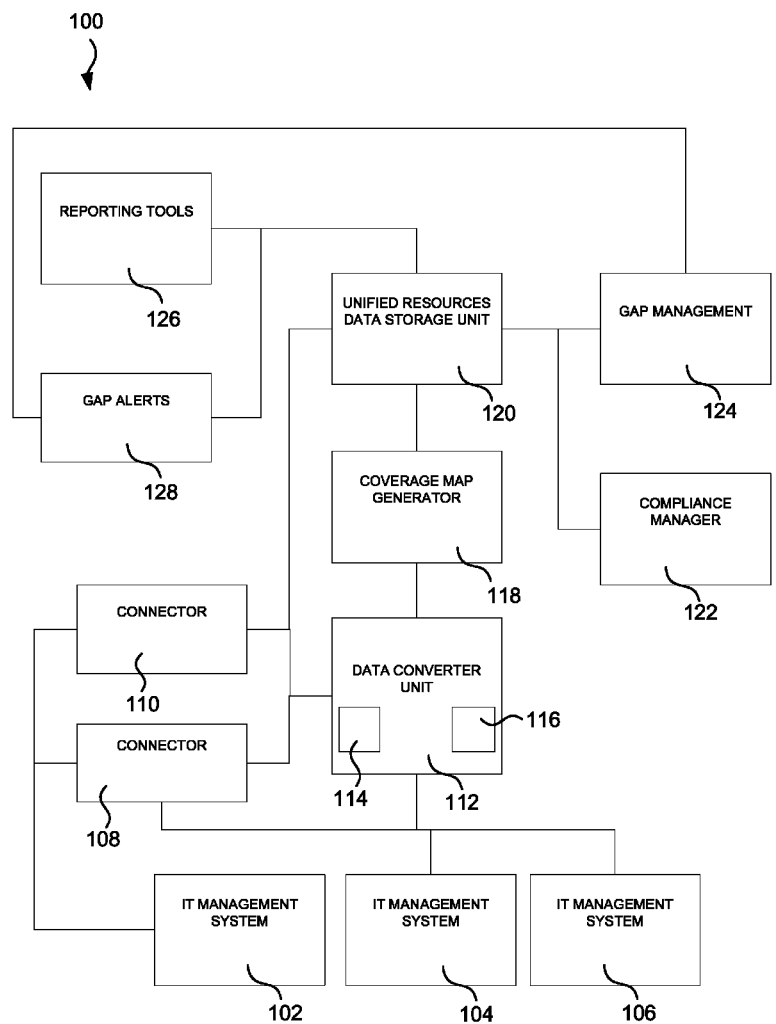
FIG. 1 is a block diagram of an IT management system manager according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber, with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a block diagram of a system 100 according to an example embodiment. IT management systems 102, 104, and 106 may each be coupled to one of connectors 108 and 110. Connectors 108 and 110 may be coupled to a data converter unit 112 and a unified resources data storage unit 120. A coverage map generator 118 may be coupled to unified resources data storage unit 120. Coverage map generator 118 may also be coupled to data converter unit 112. A unified resources data storage unit 120 may be coupled to data converter unit 112, gap management module 124, a compliance manager 122, a gap alerts module 128, and/or a reporting tools module 126. A gap alerts module 128 may be coupled to a reporting tools module 126. Compliance manager 122 may be coupled to gap management module 124. Connections depicted may be made by any connection method whether wired or wireless.

System 100 of FIG. 1 comprises multiple IT management systems, 102, 104, and 106. There are three IT management systems depicted, however, it should be appreciated that any number of IT management systems greater than one is sufficient for operation of various embodiments. IT management systems 102, 104, and 106 may be systems that manage hardware, manage software, secure user identities, govern user access rights, optimize IT resource performance, manage data storage, secure access to systems and applications in a physical environment, secure access to systems and applications in virtual environments, secure access to applications and systems in cloud environments, secure data by finding, classifying, and controlling how the data is used based on content and the identity of the user trying to gain access, any other type of IT management system, or any combination of the aforementioned types of IT management systems.

IT management systems 102, 104, and 106 may each be coupled to a connector 108 or 110 to allow IT management system data to communicate with data converter unit 112. Connectors 108 and 110 implement communication protocols which allow the connector to receive data from IT management system 102, 104, or 106 and send the data to data converter unit 112. The data received by connector 108 or 110 may be relevant to the resource coverage of IT management system 102, 104, or 106. The data received by connector 108 or 110 may be relevant to an IT management system's compliance with policies or regulations relating to the IT resources managed by IT management systems 102, 104, and 106. IT management system 102, 104, and/or 106 may be coupled directly to coverage map generator 118 (coupling not shown) in the case that the IT management systems 102, 104, and/or 106 utilize a communication protocol compatible with coverage map generator 118.

Connectors 108 and 110 are optional. Connector 108 or 110 may send data to IT management system 102, 104, or 106. The data sent to the IT management system 102, 104, or 106 from connector 108 or 110 may be sent to connector 108 or 110 from a unified resources data storage unit 120. Connectors 108 and 110 may comprise a communication interface operable to communicate between data converter unit 112 and/or IT management system 102, 104, or 106. Connector 108 or 110 may be a communication interface operable to communicate between a unified resources data storage unit 120 and IT management system 102, 104, or 106. There are two connectors 108 and 110 shown in FIG. 1, however, it should be appreciated that any number of connectors, zero or more, may be used to implement system 100. Connectors 108 and 110 may correspond to a wired connection or a wireless connection in various embodiments.

Data converter unit 112 is optional and may provide a communication interface between connector 108 and/or 110 and coverage map generator 118. Data converter unit 112 may comprise a set of tools 114 to facilitate data conversion from the format the data is in when it is received from connector 108 or 110 to a format compatible with coverage map generator 118. Data converter unit 112 may comprise a set of definitions 116. The set of definitions 116 may define how to transform the data received from connector 108 or 110 into a format compatible with coverage generator map 110 and/or unified data resources data storage system 104. The set of definitions 116 may allow data to be sent from unified resources data storage unit 120 to data converter unit 112. The data received at data converter unit 112 from the unified resources data storage unit 120 may be converted by data converter unit 112 into a format compatible with IT management system 102, 104, or 106. Connector 108 or 110 may send data that was converted into the IT management system compatible format to the corresponding IT management system 102, 104, or 106. Set of definitions 116 may comprise metadata and/or other data indicating how to convert data to a form compatible with coverage map generator 118 and/or unified resources data storage unit 120. A definition for a commonly used IT management system that may be comprised in set of definitions 116 may be predefined. The system may aggregate the relevant IT management system data from IT management systems 102, 104, and 106 one IT management system 102, 104, or 106 at a time. The data converter unit 112 may comprise hardware or software capable of analyzing data received by data converter unit 112 and flagging any possible downstream problems with the data.

Set of definitions 116 of IT coverage policies/regulations implemented by IT management system 102, 104, and 106 may be made in at least three ways: 1) a user may define policies/regulations to be followed by IT management system 102, 104, or 106; 2) the user may use predefined rules to be followed by IT management system 102, 104, or 106; or 3) the user may choose to import IT policies/regulations that are being followed by IT management systems 102, 104, and/or 106 and extract IT coverage policies/regulations.

Coverage map generator 118 may be coupled to data converter unit 112 so as to allow coverage map generator 118 to send data to and receive data from data converter unit 112. Coverage map generator 118 may be coupled to unified resources data storage unit 120 so as to allow coverage map generator 118 to send data to and receive data from unified resources data storage unit 112. Coverage map generator may be coupled to IT managements systems 102, 104, and 106 to send data to and receive from IT management systems 102, 104, and 106. Coverage map generator 118 may be coupled to compliance manager 122, gap management module 124, reporting tools module 126, and/or gap alerts module 128 to allow for data transfer that may aid in determining if there are any resource gaps and possible compliance issues in IT management systems 102, 104, and 106. Coverage map generator 118 may analyze the data received from data converter unit 112 and create united resources data (URD). URD is data that defines, in part, an IT coverage map. Coverage map generator 118 may be coupled to connector 108 and/or 110, in an example embodiment. Coverage map generator 118 may ensure that each IT resource that is being managed by an IT management system 102, 104, or 106 has a single entry in the URD, in an example embodiment. Coverage map generator 118 may comprise tools capable of ensuring the correctness of data being imported. Coverage map generator 118 may comprise tools capable of checking the correctness of a coverage map that has been, or is in the process of being, generated.

Coverage map generator 118 is operable to create coverage maps. A coverage map may aid in indicating if there is a gap in IT resource coverage of IT management systems 102, 104, or 106. A coverage map may also indicate whether a resource gap causes a potential compliance issue. An IT resource gap may be discovered by comparing IT management system data of IT management systems 102, 104, and 106. The IT management system data may be relevant to IT resource coverage and/or policy compliance of IT management system 102, 104, and/or 106.

Coverage map generator 118 may be responsible for determining potential IT resource gaps in a given IT management system 102, 104, or 106. IT resource gaps may be discovered by first, retrieving data from IT management systems 102, 104, and/or 106 and converting the data retrieved into URD. The URD from different IT management systems 102, 104, or 106 may then be compared to identify IT resource gaps. The IT resource gaps identified may be saved in URD format in unified resource data storage unit 120. For example IT management system 102 may manage applications installed on a machine and the data received from IT management system 102 may be in the form {machine id, application id}. IT management system 104 may manage authorization to use applications on the machine. The data received from IT management system 104 may be in the form {authorization id, application id, node id, user id}. IT management system 106 may control access to the machine. The data received from IT management system 106 may be in the form {access id, machine id, user id}. The coverage map generator 118 may match the application id to the access id, and the machine id to the node id. The coverage map generator 118 may aid in the process of connecting the matching items in the unified resources data storage unit 120. A search may be completed to determine if IT management system 102 is not managing a particular {machine id, application id} stored in the unified resources data storage unit 120. A search of the unified resources data storage unit 120 may be made to determine if there are particular {authorization id, application id, node id, user id} entries not managed by IT management system 104. A search of the unified resources data storage unit 120 may be done to determine if there are particular {access id, machine id, user id} entries not managed by IT management system 106.

Unified resources data storage unit 120 stores URD and IT coverage maps, among other things. Unified resources data storage unit 120 may store data about how each IT resource is managed by IT management system 102, 104, or 106 that manages the IT resource. Some examples of IT resources are computers, applications, licenses, files, internet, databases, or anything that aids in rendering data in a visual format. One of ordinary skill in the art would appreciate that more than one IT management system 102, 104, and 106 may be managing, at least part of, a single IT resource simultaneously. Unified resources data storage unit 120 may store data relevant to how each IT resource is identified by IT management system 102, 104, or 106 that manages the IT resource. Unified resources data storage unit 120 may store data relevant to the relationships between IT resources, IT management systems, and/or both. This may be important in systems that manage IT resources at different levels. For example, one IT management system 102, 104, or 106 may manage make, model, and other specifications of computers in an office, while another IT management system 102, 104, or 106 may manage the software and/or licensing that is used on the same computers in the office.

The unified resources data storage unit 120 may be coupled to reporting tools 102 and a gap alerts module 128 to facilitate the sending and receiving of data corresponding to IT resource coverage and IT management system compliance with policies or regulations. Reporting tools 102 may create reports to aid an analysis of IT resource coverage for a given set of IT management systems 102, 104, and 106. The reporting tools may be coupled to the gap alerts module 126 to communicate that a gap may have been discovered. The gap alerts module 126 may send alerts to relevant personnel after a gap in IT resource coverage is found. Gap alerts module 126 may send an alert to gap management module 124. Gap alerts module 126 may send an alert, via email or any messaging service, to relevant personnel. Relevant personnel may comprise an IT administrator, IT manager, or any other person that may have the knowledge and skill necessary to understand the alert. The alert sent from gap alerts module 126 can communicate that a resource gap exists, that a step needs to be taken to fill a gap, or that a step to be taken to fill a gap is past due. The alert sent from gap alerts module 126 can comprise a relevant time frame in which a step to fill a gap should be taken.

Compliance manager 122 may be coupled to unified resources data storage unit 120 and gap management module 124 to communicate data relevant to managing compliance issues. Compliance manager 122, in an example embodiment, is a set of tools to verify compliance with regulations and/or policies relating to IT resources. In an example embodiment compliance manager 122 is a set of tools to verify compliance with policies/regulations used in IT management system 102, 104, or 106. The verification may be done by ensuring that the determination of policy compliance is being made using a full scope of possible policy/regulation violations. In an example embodiment an analysis of a full scope of possible policy/regulation violations is achieved by comparing URD related to different IT management systems 102, 104, and 106 and determining if IT management system 102, 104, or 106 is managing all of the IT resources it should be managing. In an example embodiment a full scope of possible policy/regulation violations is achieved by comparing URD related to different IT management systems 102, 104, and 106 and determining if IT management system 102, 104, or 106 is receiving all of the information it needs to determine if the IT resources it manages are in compliance with the policy/regulation.

In an example embodiment compliance manager 122 may take steps to remediate a policy/regulation violation. The steps that may be taken by compliance manager 122 to remediate a possible compliance violation are: 1) assemble a list of policies; 2) compare data from unified resources data storage unit 120 to policies to determine if there are violations; 3) assign violations to relevant personnel; 4) document actions and decisions made by the relevant personnel; 5) document if further action is required to address the violation, this may be accomplished by labeling the violation "fixed," "ignore until" a certain date, or "ignore;" and 6) verify the process if necessary.

Gap management module 124 may be coupled to unified resources data storage unit 120, gap alerts module 128, and/or compliance manager 122 to communicate data relevant to managing gaps in IT management system resource coverage. The gap management module 124, in an example embodiment, approves a gap when it is determined that the gap does not create a compliance issue and there is no need to bridge the gap. The gap management module 124, in an example embodiment, may handle a list. The list may comprise possible steps to take to bridge a gap, time frames in which to take the steps, and alternative methods of bridging the gap. The gap management module 124, in an example embodiment, manages the process of closing a gap in IT management system 102, 104, or 106. In an example embodiment the gap management module 124 may comprise an input port which allows an IT management resource manager or other user to input whether the gap does not create a compliance issue and is approved. The input port may allow the manager and/or user to input a list that comprises steps to take to bridge a gap, time frames in which to take the steps, and alternative methods of bridging the gap.

For example, gap management module 124 may become aware that there is a resource gap in IT management system 102, through a communication from gap alerts module 128. In response gap management module 124 may work with compliance manager 122 to determine if the resource gap creates a possible policy compliance issue. If there is no compliance issue gap management module 124 may indicate that the gap has been approved. Alternatively, whether there is a potential compliance issue or not, gap management module 124 may determine steps to take to bridge the resource gap. Gap management module 124 may determine that there are multiple ways to bridge the resource gap and record steps to take to bridge the gap in multiple ways. Gap management module 124 may record the status of the gap (e.g. approved, fixed, or in need of action), in a list that is handled by gap management module 124. Gap management module 124 may also comprise possible solutions to fixing the gap in the list and handle that list. The possible solutions to fixing the gap may comprise timelines regarding which steps may be taken and when they may be taken. Handling the list may comprise managing storage of the list, recording the status of the gaps, the status of the steps to be taken to fill the gap, and/or communicating to gap alerts module 128 when a step needs to be taken to fill a gap.

A coverage map and/or report may be used to get an overview of an organization's IT coverage. A workflow relating to fixing policy/resource compliance issues or bridging resource gaps in IT management systems 102, 104, or 106 can be created and sent to users. The users may be IT system managers or anyone associated with the management of the IT resources. Users may be granted access to the coverage maps, coverage reports, and/or compliance reports created. Users may be sent the coverage reports, compliance reports, and/or coverage maps some time after the coverage maps and/or reports are created.

Figure 2:
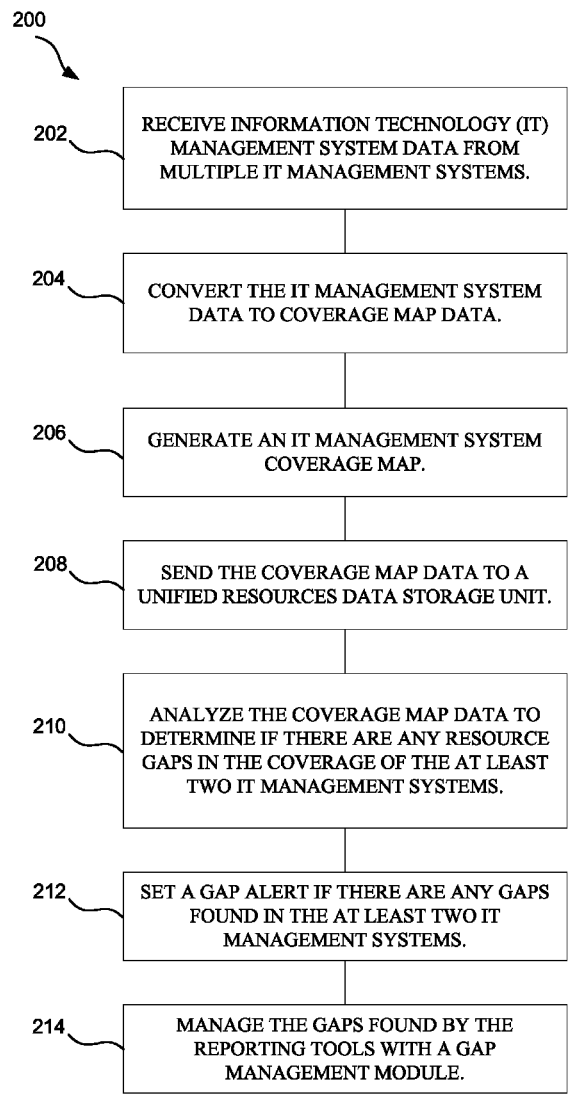
FIG. 2 is a flowchart diagram of a method of managing IT management systems according to an example embodiment.

FIG. 2 is a flowchart diagram of a method according to an example embodiment. Method 200 is a method of determining gaps in the IT resource coverage of IT management systems 102, 104, and 106. At 202, data is received from multiple IT management systems 102, 104, and 106. The data identifies IT resource coverage known to each respective IT management system 102, 104, and 106.

Item 204 is optional. At 204, the IT management system data is converted to a form compatible with a coverage map generator 118. The converted data may be called coverage map data. An IT management system coverage map is generated at 206. The coverage map may be created as a function of the coverage map data. The coverage map is created using the coverage map generator 118.

At 208, coverage map data is sent to a unified resources data storage unit 120. The coverage map data may be analyzed by coverage map generator 118 to identify if there are any IT resource gaps in the resource coverage of IT management systems 102, 104, and 106, at 210. If a resource gap is found a gap alerts module 128 may set a gap alert, at 212. At 214, a gap management tool may manage a resource gap that is discovered in one of multiple IT management systems. In an example embodiment the gap management tool is gap management module 124. Items 208, 210, 212, and 214 are optional.

Managing the resource gap may comprise analyzing the identified resource gap to determine if the identified gap creates a compliance issue and approving the gap when the gap does not create a compliance issue. Managing the resource gap may comprise handling a list that comprises steps to take to bridge the gap, time frames in which to take the steps, and the list may also comprise alternative methods of bridging the gap when there is a need to bridge the gap.

Figure 3:
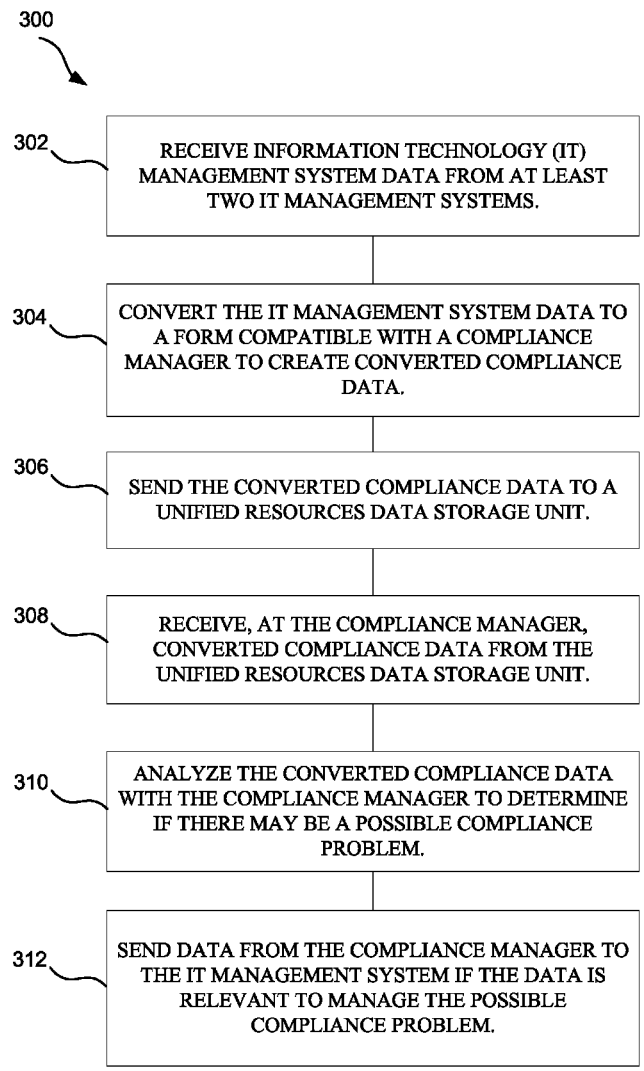
FIG. 3 is a flowchart diagram of a method of managing IT management systems according to an example embodiment.

FIG. 3 is a flowchart diagram of a method according to an example embodiment. Method 300 is a method of determining if possible policy or regulation compliance issues exist in IT management systems 102, 104, and 106. The method 300 comprises, at 302, receiving IT management system data from at least two IT management systems 102, 104, and 106. The data received identifies a policy and/or regulation for each IT management system 102, 104, and/or 106 that the respective IT management system 102, 104, or 106 must comply with. Item 304 is optional. At 304, the IT management system data is converted to a form compatible with compliance manager 122. The converted data may be called converted compliance data. Item 306 is optional. At 306, the converted compliance data is sent to unified resources data storage unit 120. At 308, compliance manager 122 receives the converted compliance data from unified resources data storage unit 120. At 310, the converted compliance data may be analyzed to determine if there is a possible policy or regulation compliance problem. In an example embodiment, compliance manager 122 may do the analyzing. In an example embodiment analyzing comprises comparing converted compliance data of IT management systems 102, 104, and 106 to determine if IT management system 102, 104, or 106 receives all data required to manage a full scope of an identified compliance problem. Item 312 is optional. At 312, data is sent from the compliance manager 122 to IT management system 102, 104, or 106 if the data is relevant to manage a full scope of a possible regulation or policy compliance issue.

Figure 4:
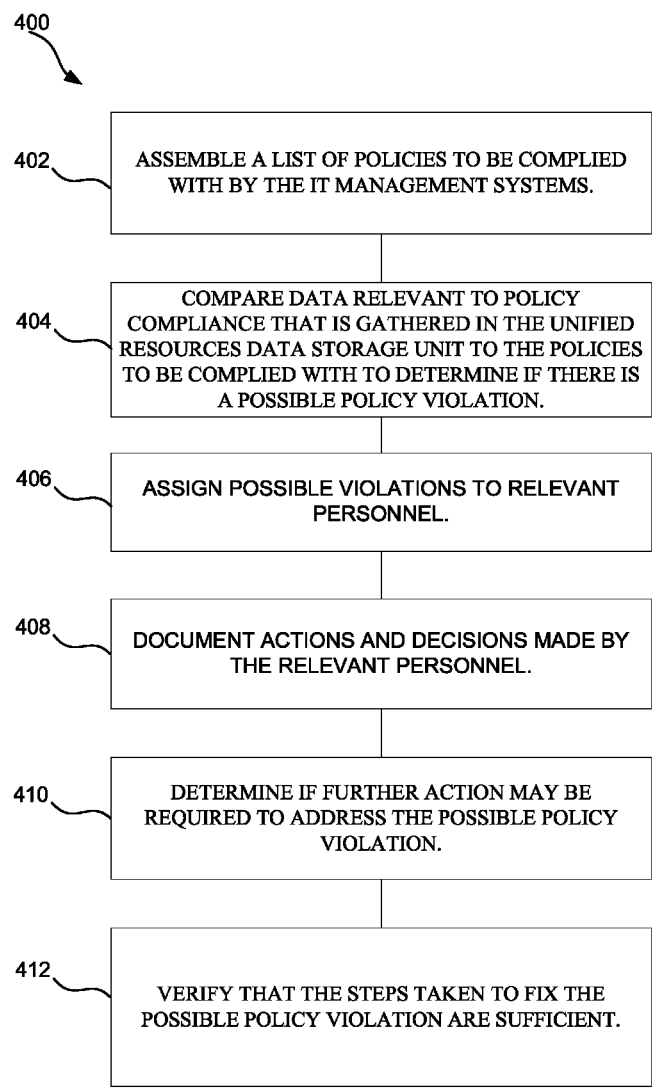
FIG. 4 is a flowchart diagram of a method of managing possible policy violations found in an IT system.

FIG. 4 is a flowchart diagram of a method of managing possible policy violations found in an IT system. The steps that may be taken to remediate possible compliance violation are: at 402, assemble a list of policies to be complied with by the IT management systems 102, 104, and 106; at 404, compare data relevant to policy compliance that is gathered in unified resources data storage unit 120 to the policies to be complied with by IT management systems 102, 104, and 106 to determine if there is a possible policy violation; at 406, assign a possible violation to relevant personnel, relevant personnel comprising IT management personnel and/or anyone related to the administration of IT management system 102, 104, or 106; at 408, document an action and/or decision made by the relevant personnel; at 410, determine and/or document if further action is required to address the violation, this may be accomplished by labeling the violation "fixed," "ignore until" a certain date, or "ignore;" and at 412, verify the steps taken to fix the possible policy violation were sufficient.

In an example, a method and system operate in conjunction with information technology (IT) systems to generate a complete and up to date list of IT resources. Multiple IT management systems' lists of IT resources are analyzed to create an IT coverage map. Tools may be provided to discover potential problems resulting from the discovered gaps. Further tools may be provided to manage the gaps discovered. Gaps in IT management system coverage may be analyzed to identify policy compliance issues. Steps may be taken to fix gaps and/or compliance issues discovered.

A method, according to an example embodiment comprises receiving, at a computer, information technology (IT) management system data from at least two IT management systems, wherein the data identifies resource coverage known to each respective IT management system, and generating, via the computer, an IT management system coverage map on a computer readable storage device as a function of the IT management system data using the coverage map generator. The coverage map indicates if there is a gap in IT resource coverage of the at least two IT management systems and whether the IT resource gap creates a potential compliance issue with one of the at least two IT management systems. The IT resource gap may be discovered by comparing the IT management system data of the at least two IT management systems.

The method may further comprise, before generating an IT management system coverage map, converting the IT management system data to a form compatible with the coverage map generator.

The method may further comprise analyzing the coverage map to identify resource gaps in the IT resource coverage of the at least two IT management systems.

The method may further comprise setting a gap alert if there is a resource gap found in one of the at least two IT management systems.

The method may further comprise managing the resource gap found with a gap management tool.

The method may further comprise managing the resource gap found, comprising analyzing the identified resource gap to determine if the identified gap creates a compliance issue, approving the gap when the gap does not create a compliance issue, and handling a list that comprises steps to take to bridge the gap and time frames in which to take the steps.

The method may further comprise identifying a policy for each of the multiple IT management systems, and analyzing the IT management system data and the identified policies to identify compliance problems.

The analyzing may comprise comparing the IT management system data of the at least two IT management systems to determine if the IT management systems receive all data required to manage a full scope of an identified compliance problem.

The method may further comprise sending data from the compliance manager to the IT management system if the data is required to manage the full scope of the possible compliance problem.

A system according to an example embodiment may comprise at least two IT management systems, and a coverage map generator coupled to the at least two IT management systems. The coverage map generator may create coverage maps as a function of IT resource coverage of the at least two IT management systems, wherein the coverage map indicates if there is a gap in IT resource coverage of the at least two IT management systems and whether the IT resource gap creates a potential compliance issue with one of the at least two IT management systems. The IT resource gap may be discovered by comparing the IT management system data of the at least two IT management systems.

The system may further comprise a connector coupled to at least one of the at least two IT management systems, and a data converter unit coupled to the connector, wherein the data converter unit converts data received from the connector to a form compatible with the coverage map generator.

The system may further comprise a reporting tools module coupled to the coverage map generator, wherein the reporting tools module creates reports to aid an analysis of whether there is a gap in IT resource coverage of at least one of the at least two IT management systems.

The system may further comprise a gap alerts module coupled to the coverage map generator, a gap management module coupled to the gap alerts module and the coverage map generator, wherein the gap alerts module may send an alert to the gap management module after the gap in IT resource coverage is identified. The gap management module may analyze the identified resource gap to determine if the identified resource gap creates a compliance issue and the gap management module may approve the gap when the gap does not create a compliance issue.

The system may further comprise a compliance manager module coupled to the coverage map generator, wherein the compliance manager comprises a set of tools to verify that a policy relating to the IT resources managed by the at least two IT management systems is complied with.

Figure 5:
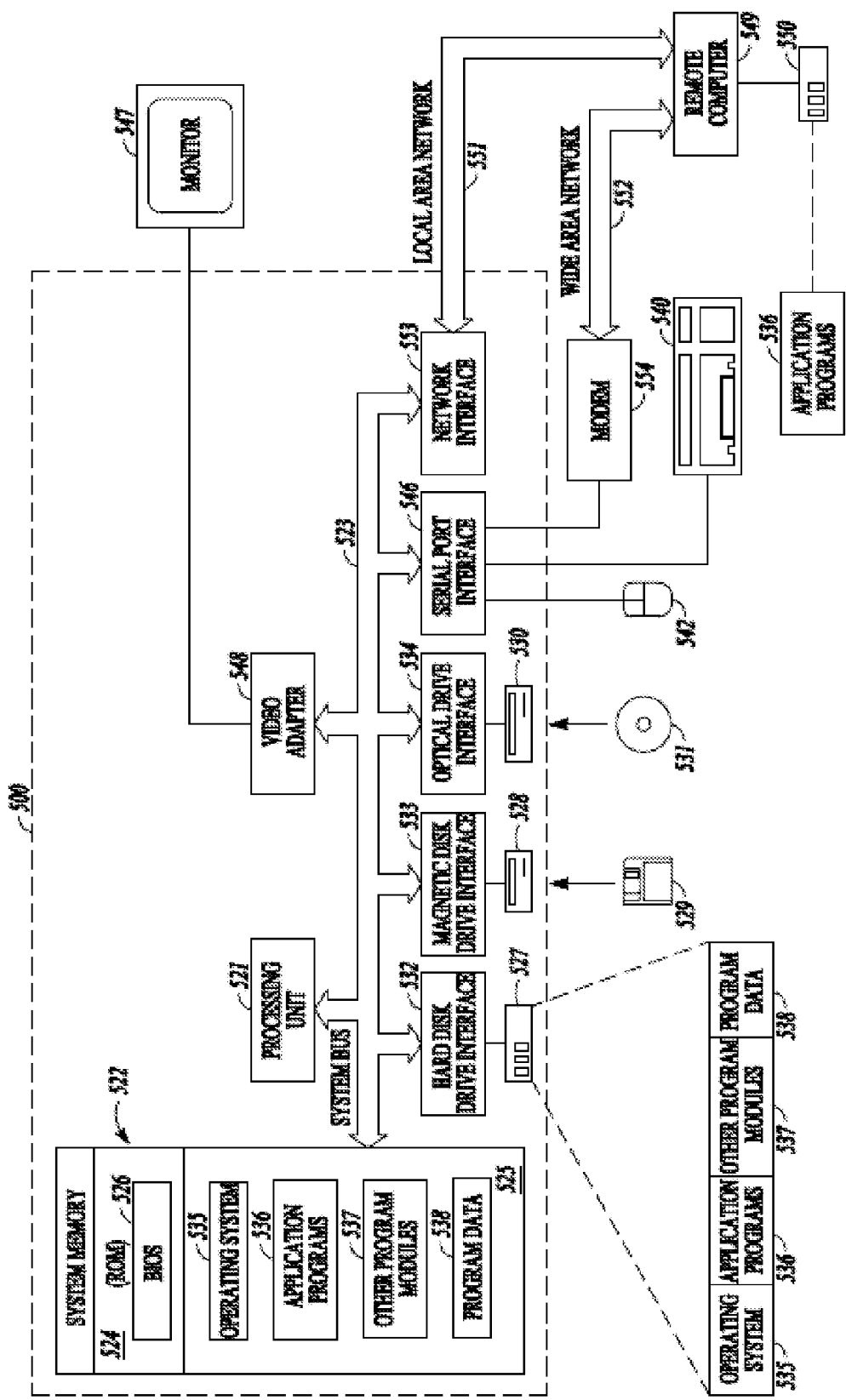
FIG. 5 is an example computer system used in conjunction with a system or method for managing IT management systems according to an example embodiment.

FIG. 5 is a block diagram of a computer system to implement methods according to an example embodiment. The computer system comprises components which comprise a machine readable storage medium that stores instructions, the instructions, which when performed by a machine, cause the machine to perform operations. The operations may comprise the steps of any method discussed in this application. In the embodiment shown in FIG. 5, a hardware and operating environment is provided that is applicable to any of the servers and/or remote clients shown in the other Figures.

As shown in FIG. 5, one embodiment of the hardware and operating environment comprises a general purpose computing device in the form of a computer 400 (e.g., a personal computer, workstation, or server), comprising one or more processing units 521, a system memory 522, and a system bus 523 that operatively couples various system components comprising the system memory 522 to the processing unit 521. There may be only one or there may be more than one processing unit 521, such that the processor of computer 500 comprises a single central-processing unit (CPU), or a plurality of processing units, commonly referred to as a multiprocessor or parallel-processor environment. In various embodiments, computer 500 is a conventional computer, a distributed computer, or any other type of computer.

The system bus 523 can be any of several types of bus structures comprising a memory bus or memory controller, a peripheral bus, and a local bus using any of a variety of bus architectures. The system memory can also be referred to as simply the memory, and, in some embodiments, comprises read-only memory (ROM) 524 and random-access memory (RAM) 525. A basic input/output system (BIOS) program 526, containing the basic routines that help to transfer information between elements within the computer 500, such as during start-up, may be stored in ROM 524. The computer 500 further comprises a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media provide non volatile storage of computer-readable instructions, data structures, program modules and other data for the computer 500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 529, optical disk 531, ROM 524, or RAM 525, comprising an operating system 535, one or more application programs 536, other program modules 537, and program data 538. Programming for implementing one or more processes or method described herein may be resident on any one or number of these computer-readable media.

A user may enter commands and information into computer 500 through input devices such as a keyboard 540 and pointing device 542. Other input devices (not shown) can comprise a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 547 can display a graphical user interface for the user. In addition to the monitor 547, computers typically comprise other peripheral output devices (not shown), such as speakers and printers.

The computer 500 may operate in a networked environment using logical connections to one or more remote computers or servers, such as remote computer 549. These logical connections are achieved by a communication device coupled to or a part of the computer 500; the disclosure is not limited to a particular type of communications device. The remote computer 549 can be another computer, a server, a router, a network PC, a client, a peer device or other common network node, and typically comprises many or all of the elements described above I/O relative to the computer 500, although only a memory storage device 550 has been illustrated. The logical connections depicted in FIG. 5 comprise a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 is connected to the LAN 551 through a network interface or adapter 553, which is one type of communications device. In some embodiments, when used in a WAN-networking environment, the computer 500 typically comprises a modem 554 (another type of communications device) or any other type of communications device, e.g., a wireless transceiver, for establishing communications over the wide-area network 552, such as the internet. The modem 554, which may be internal or external, is connected to the system bus 523 via the serial port interface 546. In a networked environment, program modules depicted relative to the computer 500 can be stored in the remote memory storage device 550 of remote computer, or server 549. It is appreciated that the network connections shown are exemplary and other means of, and communications devices for, establishing a communications link between the computers may be used comprising hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A computer implemented method comprising:
    receiving at a computer, information technology (IT) management system data from at least two IT management systems, wherein the data identifies resource coverage known to each respective IT management system;
    generating via the computer, an IT management system coverage map as a function of the IT management system data using a coverage map generator, wherein the coverage map indicates resource coverage of the at least two IT management systems;
    discovering one or more IT resource gaps in the resource coverage of the at least two IT management systems by comparing the IT management system data of the at least two IT management systems;
    analyzing the generated coverage map to determine whether the one or more IT resource gaps create a compliance issue with one or more policies to be followed by the at least two IT management systems; and
    wherein the comparing comprises:
        comparing configuration settings of the at least two IT management systems represented in the IT management system data received from the at least two IT Management systems and determining whether access and authorization information about an IT resource received from different ones of the at least two IT management systems match; and
        when the access and authorization information from different ones of the IT management systems do not match, identifying an IT resource gap and writing data to the coverage map representing the identified resource gap.

2. The method of claim 1, further comprising, before generating the IT management system coverage map, converting the IT management system data to a form compatible with the coverage map generator.

3. The method of claim 1, further comprising:
    setting a gap alert if there is a resource gap found in one of the at least two IT management systems.

4. The method of claim 3, further comprising:
    managing the resource gap found with a gap management tool.

5. The method of claim 4, wherein the managing of the resource gap found further comprises:
    analyzing the identified resource gap to determine if the identified gap creates a compliance issue;
    approving the gap when the gap does not create a compliance issue; and
    identifying steps to take to bridge the gap and determining time frames in which to take the steps.

6. The method of claim 1, further comprising:
    identifying at least one policy for each of the at least two IT management systems; and
    analyzing the IT management system data based on the identified policies to identify possible compliance issues.

7. The method of claim 6, wherein the analyzing comprises comparing the IT management system data of the at least two IT management systems to determine if the IT management systems have access to data required to manage the identified possible compliance issues.

8. The method of claim 7, further comprising:
    sending data from a compliance manager to the at least two IT management systems, if the IT management systems do not have access to data required to manage the identified possible compliance issues.

9. A system comprising:
    one or more processors; and
    a memory coupled to the one or more processors, the memory storing a computer readable program code that is executed by the one or more processors, wherein the program code comprises:
    a connector to receive information technology (IT) management system data from at least two IT management systems, wherein the data identifies resource coverage known to each respective IT management system; and
    a coverage map generator coupled to the connector, the coverage map generator configured to:
        generate an IT management system coverage map as a function of the IT management system data, wherein the coverage map indicates an resource coverage of the at least two IT management systems;

discover one or more IT resource gaps in the resource coverage of the at least two IT management systems by comparing the IT management system data of the at least two IT management systems;

analyze the generated coverage map to determine whether the one or more IT resource gaps create a compliance issue with one or more policies to be followed by the at least two IT management systems; and wherein the comparing comprises:
  comparing configuration settings of the at least two IT management systems represented in the IT management system data received from the at least two IT Management systems and determining whether access and authorization information about an IT resource received from different ones of the at least two IT management systems match; and
  when the access and authorization information from different ones of the IT management systems do not match, identifying an IT resource gap and writing data to the coverage map representing the identified resource gap.

10. The system of claim 9, wherein the computer program further comprising the connector coupled to at least one of the at least two IT management systems, and a data converter unit coupled to the connector, wherein the data converter unit converts data received from the connector to a form compatible with the coverage map generator.

11. The system of claim 9, wherein the computer program further comprising a reporting tools module coupled to the coverage map generator, wherein the reporting tools module creates reports to aid an analysis of whether there is a gap in resource coverage of at least one of the at least two IT management systems.

12. The system of claim 9, wherein the computer program further comprising a gap alerts module coupled to the coverage map generator, a gap management module coupled to the gap alerts module and the coverage map generator, wherein the gap alerts module sends an alert to the gap management module after a resource gap is identified, and wherein the gap management module analyzes the identified resource gap to determine if the identified resource gap creates a compliance issue and the gap management module approves the gap when the gap does not create a compliance issue.

13. The system of claim 9, wherein the computer program further comprising a compliance manager module coupled to the coverage map generator, wherein the compliance manager comprises a set of tools to verify that a policy relating to IT resources managed by the at least two IT management systems is complied with.

14. A computer program product comprising:
a computer readable storage medium device having computer readable program code stored thereon, the computer readable program code configured to:
receive information technology (IT) management system data from at least two IT management systems, wherein the data identifies resource coverage known to each respective IT management system; and generate an IT management system coverage map as a function of the IT management system data, wherein the coverage map indicates resource coverage of the at least two IT management systems;

discover one or more IT resource gaps in the resource coverage of the at least two IT management systems by comparing the IT management system data of the at least two IT management systems;

analyze the generated coverage map to determine whether the one or more IT resource gaps create a possible compliance issue with one or more policies to be followed by the at least two IT management systems;

wherein the comparing comprises:
  comparing configuration settings of the at least two IT management systems represented in the IT management system data received from the at least two IT Management systems and determining whether access and authorization information about an IT resource received from different ones of the at least two IT management systems match; and
  when the access and authorization information from different ones of the IT management systems do not match, identifying an IT resource gap and writing data to the coverage map representing the identified resource gap.

15. The computer program product of claim 14, wherein the computer readable program code configured to manage an identified resource gap.

16. The computer program product of claim 15, wherein managing the resource gap comprises:
  analyzing the identified resource gap to determine if the identified gap creates a possible compliance issue;
  approving the gap when the gap does not create a possible compliance issue; and
  identifying steps to take to bridge the gap, determining time frames in which to take the steps, and alternative methods of bridging the gap when there is a need to bridge the gap.

17. The computer program product of claim 14, wherein the IT management system data identifies at least one policy for each of the at least two IT management systems to comply with, and wherein the computer readable program code configured to analyze the IT management system data of the at least two IT management systems to identify possible compliance issues.

18. The computer program product of claim 17, wherein the analyzing comprises comparing the converted compliance data of the at least two IT management systems to determine if the at least two IT management systems have access to data required to manage an identified compliance problem issue.

19. The computer program product of claim 18, wherein the computer program code further configured to send data to the relevant IT management system if the IT management system does not have access to data required to manage the identified possible compliance issues.

* * * * *